United States Patent [19]

Rueckert et al.

[11] Patent Number: 5,325,940
[45] Date of Patent: Jul. 5, 1994

[54] DISC BRAKE CYLINDER GROOVE WITH A RECESS CONSISTING OF THREE SECTOR SURFACES

[75] Inventors: Helmut Rueckert, Reinheim; Kurt Ruehle, Karben, both of Fed. Rep. of Germany

[73] Assignee: Alfred Teves GmbH, Fed. Rep. of Germany

[21] Appl. No.: 12,064

[22] Filed: Feb. 1, 1993

[30] Foreign Application Priority Data

Feb. 1, 1992 [DE] Fed. Rep. of Germany ....... 4202927

[51] Int. Cl.$^5$ .......................... F16D 65/20; F16B 15/08
[52] U.S. Cl. .................................. 188/71.8; 188/72.4; 277/169; 277/171
[58] Field of Search ...................... 188/370, 72.4, 71.8; 277/168, 169, 171, 188 R

[56] References Cited

U.S. PATENT DOCUMENTS 4,387,901 6/1983 Ritsema ..................... 188/71.8 X
5,076,593 12/1991 Sullivan et al. ..................... 277/205

FOREIGN PATENT DOCUMENTS 3241164 5/1984 Fed. Rep. of Germany .

Primary Examiner—Robert J. Oberleitner
Assistant Examiner—Josie A. Ballato
Attorney, Agent, or Firm—Dykema Gossett

[57] ABSTRACT

A disc brake having a brake caliper provided with a hydraulic actuating device including a brake cylinder and a brake piston. The brake piston is sealed relative to the brake cylinder by way of a sealing ring arranged in a surrounding annular groove of the brake cylinder. The annular groove is provided with a recess arranged in the transitional area between a groove wall and the cylinder surface. The recess is confined by at least three surrounding conical surfaces whose angles towards the cylinder surface increase progressively, starting from the surface which borders on the cylinder surface up to the surface which borders on the groove wall.

7 Claims, 1 Drawing Sheet

DISC BRAKE CYLINDER GROOVE WITH A RECESS CONSISTING OF THREE SECTOR SURFACES

BACKGROUND

This invention relates to a disc brake.

A disc brake of the generic type is known from DE (German Patent Application) No. 32 41 164 C2. This known disc brake has a hydraulic actuating device consisting of a brake cylinder and of a brake piston arranged axially displaceably in the brake cylinder. Brake piston and brake cylinder are sealed relative to each other by means of a sealing ring. The sealing ring is arranged in a surrounding annular groove inside the brake cylinder and frictionally rests for sealing purposes on an outside surface area of the brake piston. The sealing ring does not only have the duty to seal the inside of the brake cylinder; it also helps adjust a clearance between the friction surfaces of the brake pads and the brake disc after the brake has been applied.

When the brake is actuated hydraulic pressure is applied to the brake piston which thus moves axially out of the brake cylinder. The friction between the sealing ring and the brake piston causes the sealing ring which rests on the outside surface area of the brake piston to be elastically deformed during axial displacement of the brake piston. If the hydraulic pressure is removed, the sealing ring will return to its original form, thus moving the brake piston by a small degree to the brake cylinder. A brake pad resting on the brake piston follows the axial displacement of the brake piston, with its friction surface being lifted away from the brake disc and thus a clearance being adjusted.

In general, the size of the adjusted clearance depends on the condition of the sealing ring and of the annular groove which accommodates the sealing ring, particularly on the cross-sectional shape of the annular groove. There exists a further undesired dependence on the hydraulic pressure prevailing in the brake cylinder during brake application. It is a general aim always to keep an invariably constant clearance after any brake application, no matter what hydraulic pressures will appear during brake application. In order to achieve this object there have already been many suggestions concerning different cross-sectional shapes of the annular groove. However, a generally valid measure which will reliably perform in all applications has not yet been found. For instance, the disc brake known from DE 32 41 164 C2 features a step in the transitional area between a groove wall and the cylinder surface of the brake cylinder.

SUMMARY OF THE INVENTION

It is an object of this invention to improve a disc brake of the generic type with regard to its clearance behavior.

The inventive solutions disclose the shape of the annular groove in a transitional area between a groove wall and the cylinder surface of the brake cylinder with a recess consisting of at least three sections, into which recess the sealing ring will elastically deform when the brake is applied. The boundary surfaces of the recess which are designed in accordance with this invention will only allow an elastic deformation of the sealing ring as will always ensure a reproducible identical reset travel, irrespective of the hydraulic pressure applied.

Two example embodiments of this invention will be explained in more detail, reference being made to the drawings.

DETAILED DESCRIPTION OF THE INVENTION

Figure 1:
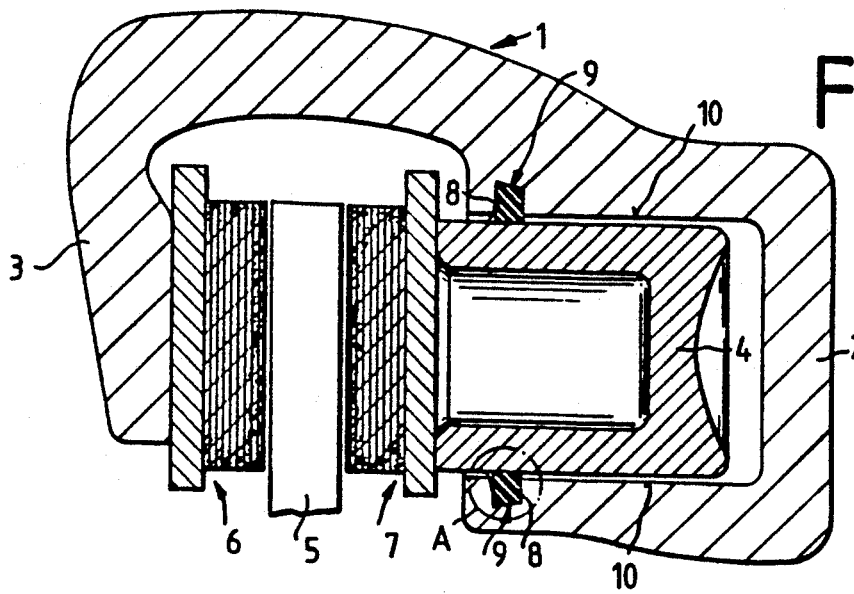
FIG. 1 illustrates a sectional view of the inventive disc brake of the present invention.
Figure 2:
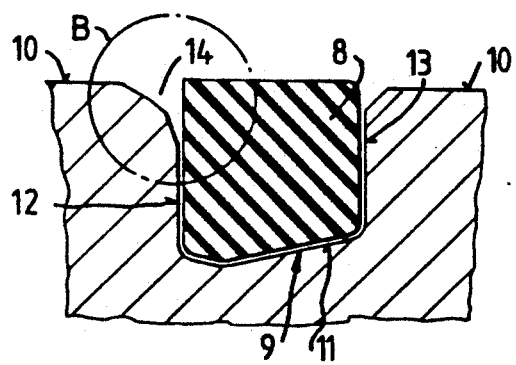
FIG. 2 is a detail A of FIG. 1 with the cross-section of an inventive annular groove.

The disc brake represented in FIG. 1 has a brake caliper 1 straddling the outside edge of a brake disc 5 and two brake pads 6, 7 arranged on both sides of the brake disc. The brake caliper 1 has a first leg designed as a brake cylinder 2 and a second leg 3 directly resting on a brake pad 6. A brake piston 4 is axially displaceably arranged in the brake cylinder 2. By means of its side projecting out of the brake cylinder 2, the brake piston 4 rests on the brake pad 7. An elastic sealing ring 8 seals the brake piston 4 relative to the brake cylinder 2. The sealing ring 8 is arranged in a surrounding annular groove 9 provided inside the brake cylinder. The groove 9 is recessed into the cylinder surface 10 of the brake cylinder 2. The annular groove 9 essentially consists of a groove bottom 11 which runs obliquely with regard to the cylinder surface 10 and of two groove walls 12, 13 which, essentially, are perpendicular to the axis of the brake cylinder. In the transitional area between the cylinder surface 10 and the groove wall 12, a surrounding notch or recess 14 is provided into which the sealing ring 8 will be pressed elastically by the brake piston 4 as the latter is axially displaced when the brake is applied.

Figure 3:
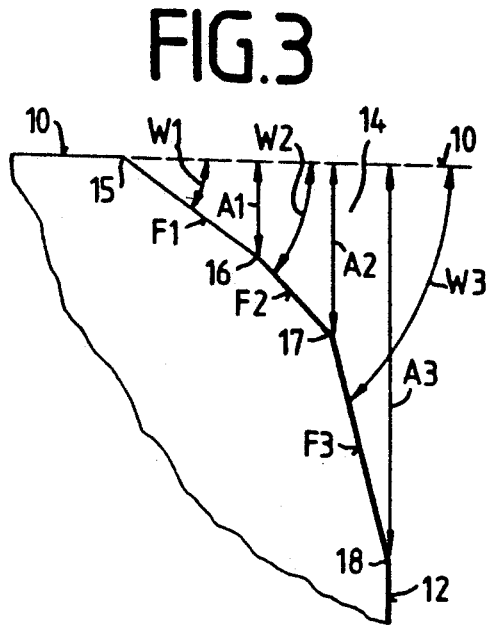
FIG. 3 is an enlarged detail B of FIG. 2 illustrating a first embodiment of this invention.
Figure 4:
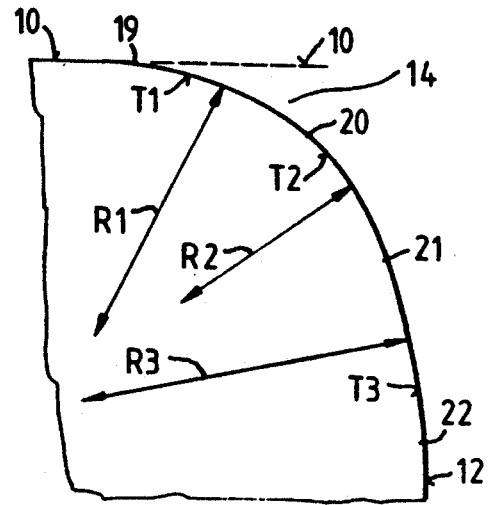
FIG. 4 is an enlarged detail B of FIG. 2 illustrating a second embodiment of this invention.

Enlarged representations of the area of the recess 14 are shown in FIGS. 3 and 4 with regard to two different examples of embodiments of this invention. The boundary surface of recess 14 consists of three adjacent surrounding conical surfaces F1, F2, F3 which, in cross-section, are shown as straight lines in FIG. 3. The angles W1, W2, W3 between the surfaces F1, F2, F3 and the cylinder surface 10 increase progressively, starting from angle W1, via angle W2, up to angle W3. With its annularly surrounding edge 15, the first surface F1 borders on the cylinder surface 10 and with edge 16 on the second surface F2 which, in turn, borders with edge 17 on the third surface F3. The third surface F3, at last, passes over into the groove wall 12 at the annularly surrounding edge 18. In the represented embodiment, the first angle W1 is 30°, the second angle W2 is 45° and the third angle W3 is 74°. The three radial distances A1, A2, A3 between the cylinder surface 10 and the appertaining edges 16, 17, 18 of the embodiment are A1=0.3 mm, A2=0.6 mm and A3=1.4. mm. The stated angles W1, W2, W3 and distances A1, A2, A3 have been found to be optimal for the represented example embodiment. However, the first surface may enclose an angle between 30°-40° and a first distance between 0.1 mm-0.4 mm; the second angle may enclose an angle between 40°-50° and a second distance between 0.5 mm-0.9 mm; and a third angle may enclose an angle between 65°-80° and a third distance between 0.8 mm-1.8 mm.

In the second example of an embodiment of this invention, represented in FIG. 4, the recess 14 is confined by three torus sector surfaces T1, T2, T3. In the illustrated cross-section, the torus sector surfaces T1, T2, T3 appear as sector arcs with different sector radii R1, R2, R3. The torus sector surfaces T1, T2, T3 border upon one another by analogy with the surfaces F1, F2, F3 of FIG. 3, with the difference that the boundary lines 19, 20, 21, 22 which annularly surround the cylinder axis do not stand out as edges. In the second example embodiment it has proved optimal to rate the first sector radius R1 so as to lie in the range of 1 mm–1.5 mm, the second sector radius R2 being rated to range from 0.9 mm–1.2 mm and the third sector radius R3 being rated to range from 1.5 mm–2 mm.

We claim:

1. A disc brake with a brake caliper which straddles the outside edge of a brake disc and brake pads arranged on both sides of the brake disc and which is provided with a hydraulic actuating device, adapted to press the brake pads to the brake disc and having at least one brake cylinder and a brake piston axially, displaceable within the brake cylinder, an elastic sealing ring arranged in a surrounding annular groove inside the brake cylinder which rests frictionally for sealing purposes on an outside surface area of the brake piston, the annular groove having a groove wall nearest to the brake pads which is generally perpendicular to the brake piston axis and a surrounding recess adjacent to the brake cylinder, said recess receiving the sealing ring which is elastically pressed by the brake piston as the latter is axially displaced when the brake is applied, said recess having at least three adjacent surrounding conical surfaces the cross-sections of which are generally straight lines, with the angles of the straight lines towards the brake cylinder axis increasing progressively, starting from the surface which borders on the cylinder surface to the surface which borders on the groove wall.

2. A disc brake as claimed in claim 1, wherein the first surface which borders on the cylinder surface and brake cylinder axis encloses an angle between 30° and 40°, the second surface enclosing an angle between 40° and 50° and the third surface enclosing an angle between 65° and 80°.

3. A disc brake as claimed in claim 2, wherein the first angle is 30°, the second angle is 45° and the third angle is 74°.

4. A disc brake as claimed in claim 2, wherein a first edge formed at the intersection of the first surface and of the second surface is a first distance of 0.1 mm–0.4 mm from the brake cylinder radius and, a second edge formed at the intersection of the second surface and of the third surface is a second distance of 0.5 mm–0.9 mm from the brake cylinder radius and a third edge formed at the intersection of the third surface and of the groove wall is a third distance of 0.8 mm–1.8 mm from the brake cylinder radius.

5. A disc brake as claimed in claim 4, wherein the first distance is 0.3 mm, the second distance is 0.6 mm and the third distance is 1.4 mm.

6. A disc brake with a brake caliper which straddles the outside edge of a brake disc and brake pads arranged on both sides of the brake disc and a hydraulic actuating device adapted to press the brake pads to the brake disc and having at least one brake cylinder and a brake piston axially, displaceable within the brake cylinder, an elastic sealing ring which is arranged in a surrounding annular groove inside the brake cylinder and which rests frictionally for sealing purposes on an outside surface area of the brake piston, said annular groove having a groove wall nearest to the brake pads which is generally perpendicular to the brake piston axis and a surrounding recess adjacent to the brake cylinder, said recess receiving the sealing ring which is elastically pressed by the brake piston as the latter is axially displaced when the brake is applied, the recess having at least three adjacent surrounding sector surfaces the cross-sections of which consist of adjacent sector arcs with different sector radii which jointly form a convex arched line.

7. A disc brake as claimed in claim 6, wherein said first sector surface borders on the cylinder surface and has, in cross-section, a first sector radius of 1 mm–1.5 mm, a second sector surface having a second sector radius of 0.9 mm–1.2 mm and a third sector surface having a third sector radius of 1.5 mm–2 mm.

* * * * *